PAUL W. PRUTZMAN
INVENTOR

PAUL W. PRUTZMAN
INVENTOR

Patented Nov. 24, 1931

1,833,335

UNITED STATES PATENT OFFICE

PAUL W. PRUTZMAN, OF LOS ANGELES, CALIFORNIA

FILTER PRESS

Application filed March 3, 1930. Serial No. 432,770.

My invention relates to a press of the general type known as the plate and frame press, composed of metal plates having corrugated surfaces on which the filtering medium rests, and with channels within the plates for the escape of liquids which pass through the filtering medium, these plates being separated by abutting flanges around their outer circumference, cast integral with the plates and forming chambers for the reception of unfiltered mixture and for the accumulation of cakes of solid matter extracted from the mixture.

My invention, however, departs from the ordinary construction of plate and frame presses in several important particulars, specifically, in placing the filtering surfaces in a horizontal instead of the customary vertical position, in providing mechanical means for removing the cake rapidly through a central opening and in enclosing the filter plates within a vertical steel shell, the object being to produce a press adapted to meet certain specific and unusual requirements rather than to produce an improved press for the general service.

In certain chemical operations, as for instance in the treatment of petroleum oils with decolorizing clays at elevated temperatures, it is essential or highly desirable to filter without any material drop in temperature, to maintain the solids in suspension in the liquid so as to obtain uniform distribution of the solids over the filtering surface, to reduce to a minimum the cooling of the press during the cleaning stage of the cycle, and to discharge the cakes without undue exposure to the air and under conditions which will avoid the formation of noxious or inflammable vapors. All of these requirements are present in the particular operation referred to, and some or all of them in many other filtrations at high temperatures, filtrations of volatile, inflammable or noxious liquids, and filtrations producing a cake which cannot safely be exposed to the air until after cooling or other treatment. These requirements are not met by any of the various types of filter press heretofore known or proposed, and it is to meet these requirements that my invention is directed.

A specific embodiment of my invention is illustrated in the attached drawings and the following description thereof, the modification shown being particularly adapted to the filtration of lubricating or other oils at temperatures close to those at which vapors are freely evolved, and the description given is in connection with that specific operation. It will be understood that I do not limit the use of my invention to such operation, as it has numerous other uses, nor to the exact structure shown, as it may be materially modified without at all departing from the spirit of my invention, which I would limit solely by the attached claims.

In the attached drawings, Fig. 1 illustrates in vertical elevation a complete embodiment of my invention, parts being broken away to show the interior construction;

Figure 1:
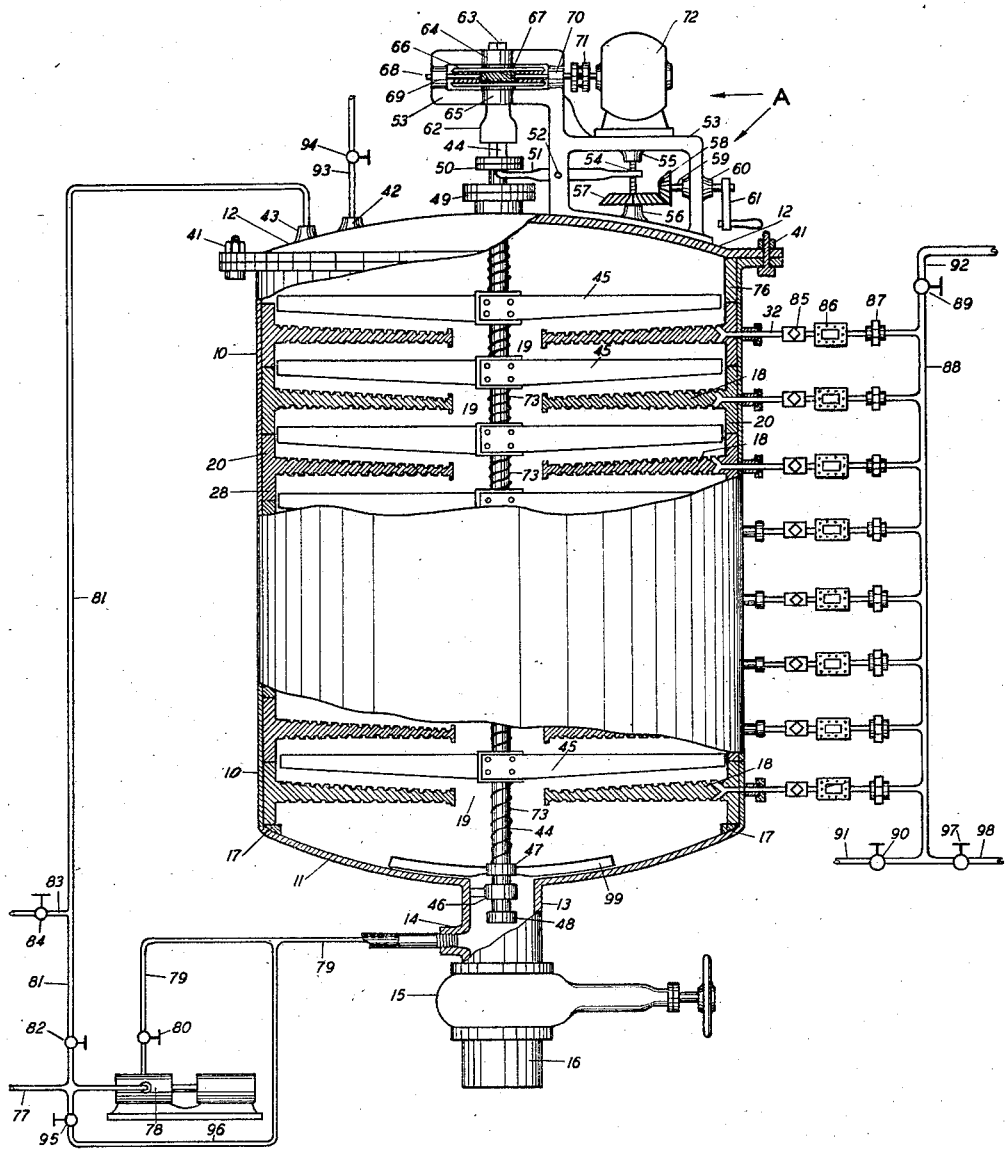

Referring to Fig. 1, 10 is a vertical cylindrical shell of steel plate having a dished bottom 11 welded thereto and a bumped upper head 12 carrying a flange which is bolted to a companion flange welded to the upper end of the shell. The tank thus formed should be of such strength as to withstand, without distortion, the maximum pressure used in the filtration for which it is designed.

At the center of the bottom head is placed a large nozzle 13, the internal diameter of this nozzle being say 18". A threaded or flanged side outlet 14 is attached to this nozzle as close to the bottom as possible; this nozzle being used for filling, feeding and emptying the shell. To the end of the nozzle is attached a straight-way valve 15 or other preferred device for holding the press pressure when closed and exposing the entire area of the nozzle when open. A nipple 16 is indicated at the lower end of this valve, for insertion into a closed container for press cake when it is desired to empty the press without bringing the cake into contact with air. At the point of junction of shell 10 with bottom 11 a plurality of small blocks or lugs 17 are placed for supporting the lower member of the stack of plates in a truly horizontal position.

Figure 2:
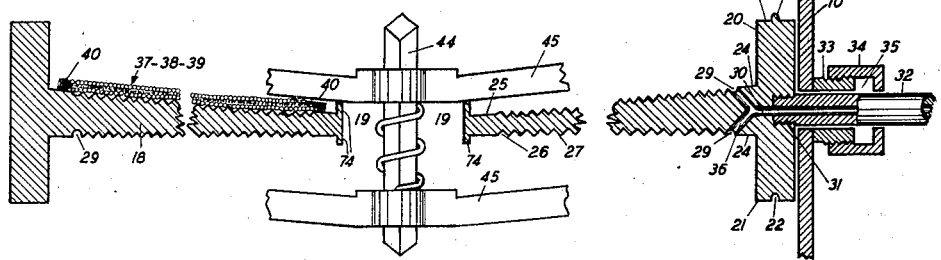
Fig. 2 is a cross section of portions of a single filtering plate.
Figure 3:
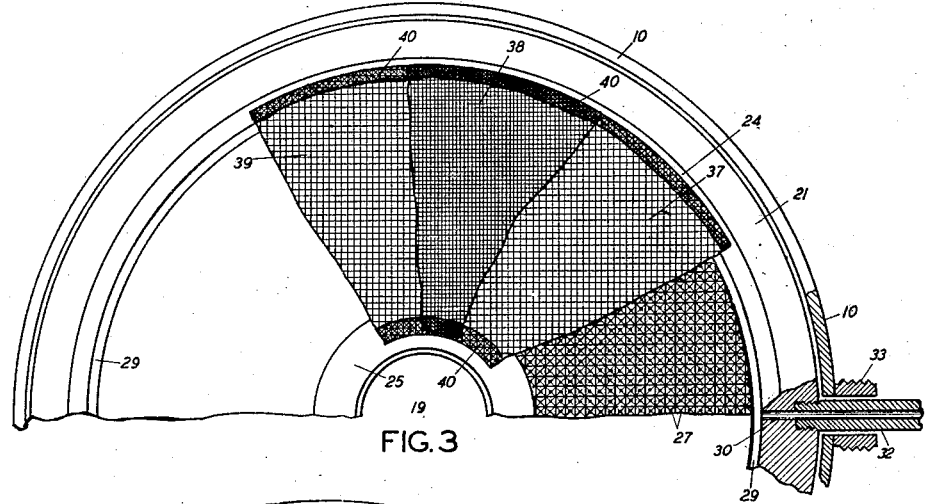
Fig. 3 is a plan view of a portion of a single filtering plate.

Within the shell is placed a stack of the plates 28, any one of which is shown on an enlarged scale and in more detail in Figs. 2 and 3. The web 18 of the plate has a central opening 19 which should be of substantially the diameter of the nozzle 13. The web is surrounded by a double flange or ring 20. This ring may be of the same height on each side of the web but it is preferable to make it visibly higher on one face than on the other so that the plates will always be inserted with the same side up, this in particular if the upper faces of the web are not sloped toward the center as shown. The plates should also be numbered serially so that they may always be put back in the same order after removal, as otherwise it will be difficult to insert the effluent pipes later described. The faces 21 of these rings are turned smooth and parallel so that they may be placed one above another to form a true vertical stack, but no packing is placed between these faces. The outer diameter of the ring should be such as to enable the plate to slide easily within the circumscribing shell 10, but too much side play should not be allowed as the faces should abut squarely. It is desirable to place one or more dowels 22 and corresponding pins 23 in these faces, to aid in placing the plates in the proper angular position for insertion of the effluent pipes. If more than one pin is used the spacing should be irregular so that registration of dowels with pins would be possible in only the correct angular position.

Circumferentially inside the ring 20 and around the central opening 19 are formed narrow smooth faces 24 and 25 for the attachment of the metallic filtering media. Between these rings and over the major part of the area of each plate the surface is corrugated or roughened in any of the well known manners of corrugating filter plates. The manner shown in the drawings, which will be understood to be illustrative only, consists of two series of parallel V grooves 26 intersecting at a right angle and so spaced in relation to their depth as to form truncated pyramids 27 projecting from the body of the plate. These projections support the filtering medium and the grooves conduct the filtrate, in the directions of least resistance, to a circumferential channel 29 formed in the face of the plate just inside the flattened portion 24.

In the body of the plate and at one point only in its circumference is formed an opening 30 which, at its outer end, is enlarged and tapped with a bottomed pipe thread 31. The inner end of this opening should be of the same internal diameter as the pipe which fits thread 31. A corresponding opening of slightly larger diameter is made through shell 10 and a stuffing box is made fast to the shell over this opening, this box consisting of the body 33 and a screw cap 34, both being adapted to receive the pipe 32 which fits thread 31. Soft packing being placed in the annular space 35 and the pipe 32 being turned smooth where this packing engages, the effluent from the filter plates is conducted through the wall of the shell while the pipes may be removed at will to permit removal of the plates.

A hole 36 is drilled from the circumferential channel 29, on each side of the plate, to communicate with the inner end of opening 30. Liquid passing through the filtering medium thus makes its way through the intersecting grooves to the nearest portion of channel 29, along this channel to the hole 36 and the communicating opening 30, and thence through pipe 32 to the exterior of the press.

The filter cloth must be of the most durable character, as the design of the press is such that it must be entirely dismounted to replace a cloth, and must be as completely protected from damage as possible. I prefer a Monel metal cloth, of the preferred fineness and character of mesh, which of course depends on the characteristics of the liquid and the solid being separated. This cloth may be placed directly on the points of the plate projections, but I prefer to support and protect it in the following manner, as shown in Figs. 2 and 3. A stiff and substantial wire mesh screen 37, preferably flat rolled, is first placed over the corrugated portion of the plate, overlapping onto the smoothed portions 24 and 25. The filter cloth 38 is placed over this screen, and finally a screen 39 having the same characteristics as screen 37 is placed on top, all these screens being cut into rings whose inner and outer edges fall on the said smoothed portions 25 and 24. These edges are then made fast by brazing or soldering to the plate, as indicated at 40. Great care should be taken to have these screen assemblies lie flat and smooth so as not to project into the path of the scrapers, and the work of attaching may well be done in a press which will force the screens into their final position while exposing the edges to be attached.

The upper bumped head is attached to the shell by readily removable bolts indicated at 41, and should be of such stiffness as to rigidly support the shaft driving gear indicated generally at A in Fig. 1. To this head are attached two pipe nozzles 42 and 43, one for use in circulating the contents of the press, the other for admitting steam or other fluid for ejecting the liquid contents of the press and for cleaning the cakes, as will be described.

The arrangements indicated at A for driving the scraper shaft may be varied over a wide range and the design shown is illustrative only.

The shaft 44 which carries and revolves the scrapers 45 is exactly centered in the shell. It may be supported at its lower end by a bracket and bearing box 46, attached to one side of the nozzle 13, the two collars 47 and 48 limiting respectively its upward and its downward movement. This shaft must be sufficiently stiff not to whip or chatter when the scrapers bite into the cake in the cleaning stage of the cycle, and may, if preferred, be given intermediate support from one or more of the plates.

The shaft passes through the upper head of the shell through a stuffing box 49. Above this shaft a ball thrust bearing 50 is removably affixed to the shaft. The lower or free half of this bearing is engaged and supported by a yoke on the free end of a lever 51 which is swivelled on a pin 52 to a convenient portion of the rigid frame 53 which is attached to head 12. The fixed end of this lever carries a swivelling threaded nut engaging a long screw 54 which revolves in bearings 55 and 56 made fast to frame 53. To one end of this screw is rigidly affixed a bevel or worm gear 57 actuated by a pinion 58 which is carried on the end of a shaft 59. This shaft is supported by a bearing 60 affixed to frame 53 and has at its opposite end a hand crank 61. If the gear and pinion combination is not so proportioned as to be irreversible a clamp or other means of locking shaft 59 must be provided, to prevent the spontaneous lowering of scraper shaft 44 during the filtering stage of the operation.

The upper end of shaft 44 is squared or splined and slides vertically in a corresponding socket 62 on the end of an aligned shaft 63, which is carried in bearings 64 and 65 on frame 53. To this shaft is affixed a worm or bevel gear 66 actuated by a corresponding pinion 67. This pinion is affixed to a shaft 68 which is carried in boxes 69 and 70 attached to suitable brackets projecting from the side of frame 53. To the end of this shaft opposite the pinion is affixed a universal joint 71 by which the shaft is directly revolved by an electric motor 72. The gear ratios must be such that the shaft 44 may be powerfully actuated at a relatively low speed, say from 10 to 20 R. P. M.

On turning the hand crank 60 overhand, screw 54 is revolved lefthand and the free end of the lever is raised; this end acting on the lower half of the thrust bearing positively lifts the shaft and scrapers, the squared end of the shaft sliding in the socket 62. On a reverse movement of the hand crank the shaft and scrapers are allowed to lower themselves by their own weight. In units of small size, or where the spring spacing device later referred to is used, it is preferable to have the yoke engage both the upper and lower sides of the thrust bearing, which may be replaced by a simple double faced disc, thus positively lowering shaft 44 and the scrapers carried thereon.

The scrapers 45 may be of cast iron with a central hub surrounding shaft 44 and affixed thereto by pins or set screws or the hub may be of cast metal and the scrapers be steel bars bolted to the hub. In case the scrapers are rigidly affixed to the shaft in either manner the stop collars 47 and 48 must be so spaced that the scrapers 45, at the limit of their travel, will closely approach but not actually touch the outside screens 39 attached to plates 28, as if the scrapers are allowed to drag on this screen it will be rapidly worn through and destroyed and, with it, the filtering cloth beneath. Positive protection against this unfortunate occurrence may be provided by making shaft 44 square between bearing 46 and stuffing box 49, as indicated at 44 in Fig. 2, providing square sockets in the scraper hubs, separating the scrapers by means of coil springs 73 (the scrapers being otherwise free to move vertically on the shaft) and providing raised lips 74 around the central opening, these lips being of such height as to engage the scraper before it touches the screen. The height of this lip is greatly exaggerated in Fig. 2, the actual thickness of the three screen layers being not over $\frac{3}{16}''$ and the height of the lip say $\frac{1}{4}''$.

It is desirable to so shape the scrapers 45 as to positively urge the broken cake toward the central opening, in particular if plates having flat upper faces are used. The straight radial scraper indicated at 45a in Fig. 4 tends to move the material away from the central opening and toward the outside of the chamber. A blade tangential to the hub, as indicated at 45b, tends to move the material in circles parallel to the circumference, while a blade curved as in 45c tends strongly to move the material inwardly. It is quite essential to the rapid discharge of the filter that the blades be so shaped as to move the broken material positively and rapidly into the central opening, and a sharply curved blade is recommended.

In order to bring the threaded openings 31 into horizontal alignment with the stuffing boxes 33 it is necessary that the faced edges 21 be brought down to perfect contact in assembling the apparatus. It is therefore desirable to insert a simple ring 76 above the uppermost plate, this ring bearing against the bottom of head 12 and being of such depth that on drawing up bolts 41 any slight warp in the plates will be straightened and the plates brought down to a firm bearing on lugs 17 and on each other.

The above described apparatus is operated in the following manner, certain attachments and auxiliaries being described and illustrated which are extraneous to the press itself and being disclosed only to illustrate an approved manner of operation.

Liquid to be filtered, such as hot oil containing finely divided clay in suspension, is brought through a pipe 77 from a source of supply not shown into the suction of any pump 78 and discharged through a pipe 79 controlled by a valve 80 into the nozzle 14 and thence into the press. If, when the press is full, the contents are not up to the full temperature of the source of supply (as will be the case the first time it is used after a shut down) it may be heated by circulating through the source of supply by means of pipe 81 controlled by a valve 82 and a branch pipe 83 controlled by a valve 84, pipe 81 being connected into nozzle 43 at the top of the press.

The desired temperature being attained valve 84 is closed and, the pump being continued in operation, pressure is put on the press. Oil then flows through the filtering media and out of the press through pipe 32, cakes of clay accumulating on both sides of the plates 28.

On leaving the press the oil passes through a control cock 85 and through a metal box 86 containing sight glasses through which the size and condition of the oil stream may be viewed. Union 87 connects this line into the manifold pipe 88 controlled by a valve 89 situated above the uppermost effluent pipe and a valve 90 situated below the lowermost. At the beginning of the filtration oil containing small amounts of clay may be discharged from the filter and such cloudy oil may be diverted through pipe 91 which communicates with the source of supply of unfiltered oil. As soon as all of the plates have been cleaned the valve 89 may be opened and the filtrate diverted through pipe 92 into a cooler or directly into a receiving tank for finished oil, not shown.

During the operation of the press, as well as during the cleaning stage, the scrapers 45 are kept in revolution at their midposition, as shown in Fig. 1, thus providing a considerable degree of agitation of unfiltered mixture. If, in spite of this agitation, the bottom plates accumulate clay faster than the top plates it will be desirable to circulate an excess quantity of oil through the press, which may be done by closing valve 82 and partially opening valve 84, which will permit a portion of the oil discharged by pump 78 to return to the source of supply. It may be desirable to reverse the control of these valves, closing 84 completely and partially opening 82, which will permit the excess quantity of oil to make its way directly back into the suction of pump 78.

When the plates have accumulated the desired thickness of cake the next step is to empty the press. This is accomplished by means of steam pressure placed on top of the liquid by means of the steam pipe 93 controlled by a valve 94 and communicating with a source of supply of steam under pressure. The unfiltered mixture contained in the tank may then be forced out by closing valve 80 on the discharge of pump 78 and opening valve 95 which controls a branch line 96 connecting pipe 79 with pipe 77 which leads back to the source of supply. Liquid will drain from the press for several minutes, during which time the passage of a small amount of steam through the press should be continued.

The press being drained valve 95 is closed and the stop cocks 85 are thrown open, valve 89 being then closed and valve 97 being opened, this valve controlling a pipe 98 leading to a means for separating water or steam from oil. The steam which continues to flow into the filter shell will displace, to a large extent, the oil contained in the cakes of clay and will pass with it out of the effluent pipes and through pipe 98.

It is usually the case that some cakes dry out faster than others and when it is observed by means of sight glasses 86 that any particular cake discharges only steam, that plate may be shut off by closing the corresponding cock 85, thus diverting the steam supply to the other cakes which have not yet been completely freed from oil. This operation is continued until all the clay cakes are substantially oil free.

The stop cocks 85 are then closed and the bottom valve 15 opened. Prior to opening this valve, if the press is at a high temperature or if for other reasons it is desired to entirely exclude air from the solid material discharged, a closed container such as a car with a substantially closed top may be placed in register with the bottom of nipple 16 so that a small amount of steam passing through the press will blow outwardly through the aperture between the nipple and the opening in the vessel and exclude air. The scrapers, which need not be stopped at any time during the entire operation, are then gradually raised until the cake accumulating on the lower surfaces of the filtering plates is scraped off and falls onto the plate next below.

Having reached the upper limit of their travel the scrapers are then lowered gradually to their lower limit, scraping into the central opening the clay dislodged from the lower surface of the plate next above and that already present as cake on the upper surface. This clay falls through the central opening 19 to the bottom of the shell, where it is likewise discharged through nozzle 13 and valve 15. This clay also falls through the central opening and out of the nozzle 13.

Figure 4:
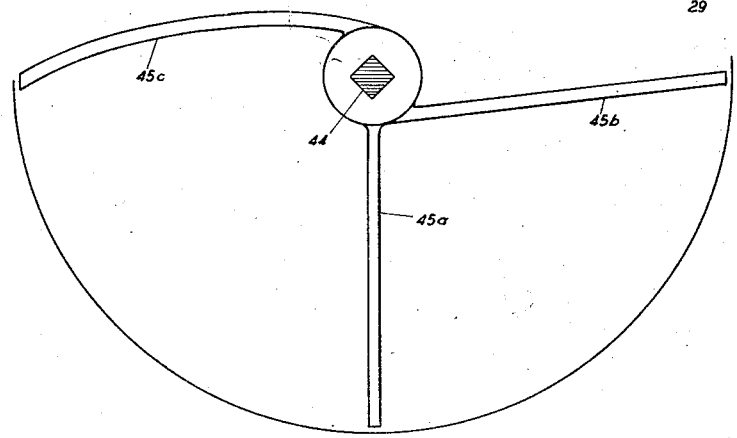
Fig. 4 is a plan view of preferred types of scrapers.

In the drawings, Figs. 1 and 2, the upper surface of the plates 28 is represented as sloping gently toward the central opening, the purpose of this slope being to assist the movement of the clay toward the center. This slope of the upper surface is desirable but not essential. The movement of the clay toward the center of the apparatus is also greatly facilitated by constructing the scrapers in the manner shown in plan in Fig. 4, in which the blades are given a forward curvature in the direction indicated by the arrow. In order to prevent the accumulation of cake around the central opening in the bottom of the shell, it is also desirable to provide a scraper of the form indicated at 99 in Fig. 1, this scraper preferably being curved as indicated in Fig. 4.

The cleaning operation having been completed, discharge valve 15 and steam valve 94 are closed. Pump discharge valve 80 is opened and the pump started and a new cycle of operations commences.

If the press is to be used at an elevated temperature as in the filtering of hot lubricating oils, the press and all its pipes and connections will be heavily insulated.

For any purpose where the maintenance of a high temperature throughout the filtering operation is of importance, this press has material advantages over types heretofore known. Once the temperature of the press is established it need never be lowered, as the loss of heat through properly applied insulation is negligible and the only heat lost in discharging the press is that due to cooling by the steam passed through the cakes and passing out of the outlet during the cleaning stage, and this loss may be entirely obviated by preheating the steam to the temperature of the entering oil.

High temperature cakes may be handled with safety as air is completely excluded from the press and may be completely excluded from contact with the discharged cake. The operation of cleaning is entirely mechanical and is performed with great rapidity, so that the press is actually filtering during the greater part of its operating time. The pressure under which filtration is conducted is limited only by the strength of the surrounding shell, the pressure on the two sides of each plate being in balance so that no strain is placed on the plates themselves. These factors make it possible to handle materials, such as extremely hot oils, which it would be impossible to handle in a filter press of ordinary construction in which it is necessary to bring the cake and large superficial areas of the metal of the press into contact with the air during the cleaning period.

The entirely enclosed construction of the press also makes it possible to handle liquids which give off poisonous or obnoxious gases, as by the simplest precautions such gases may be withdrawn from the receptacle into which the cake is discharged and conducted to a place where they may be disposed of with safety.

I do not limit myself to the exact structure disclosed, as it may obviously be varied in many details without in the least departing from the spirit of my invention, which I limit solely by the scope of the attached claims.

I claim as my invention:

1. A filter press adapted to be supported in a fixed vertical position, comprising: a cylindrical substantially closed shell having heads, the upper of said heads being removable; a nozzle of relatively large diameter centrally affixed to the bottom head and a closure for said nozzle; a plurality of horizontal filter plates stacked within said shell, rings adjacent the wall of said shell adapted to space said plates and form chambers therebetween, said plates having central openings aligned with and of substantially the same diameter as said nozzle; corrugations on both surfaces of each said plate; means for the passage of liquids from said corrugations into a threaded radial opening formed on the circumference of each said plate; a filtering medium attached to each side of each said plate and covering said corrugations; a stuffing box attached to the wall of said shell and an opening through said wall in alignment with said threaded opening; a conductor for liquids passing through said stuffing box and said shell and removably screwed into said threaded opening; a vertical shaft axially supported within said shell and said central openings in said plates, and passing through the upper of said heads; scrapers removably attached to and revolved by said shaft, the normal position of each said scraper being midway between the two adjacent plates; means for revolving said scrapers; means for raising and lowering said shaft while revolving, whereby said scraper is caused to remove solids from the lower side of the plate above on upward movement of said shaft and from the upper side of the plate below on downward movement of said shaft; means for introducing liquid to be filtered into said shell; means for introducing steam into said shell and means for circulating liquids upwardly through said shell.

2. A filter press adapted to be supported in a fixed vertical position, comprising: a cylindrical substantially closed shell having heads, the upper of said heads being removable; a nozzle of relatively large diameter centrally affixed to the bottom head and a closure for said nozzle; a plurality of horizontal metallic filter plates stacked within said shell having vertically projecting rims adapted to space said plates and form chambers therebetween, said plates having central openings aligned with and of substantially the same diameter as said nozzle; corrugations on both surfaces of each said plate, the upper surface of each said plate sloping toward said central opening; means for the passage of liquids from said corrugations into a threaded radial opening formed on the circumference of each said plate; a filtering medium attached to each side of each said plate and covering said corrugations; a stuffing box attached to the wall of said shell and an opening through said wall in alignment with said threaded opening; a conductor for liquids passing through said stuffing box and said shell and removably screwed into said threaded opening; a vertical shaft axially supported within said shell and said central openings in said plates, and passing through the upper of said heads; scrapers removably attached to and revolved by said shaft, the normal position of each said scraper being midway between the two adjacent plates; means for revolving said scrapers; means for raising and lowering said shaft while revolving, whereby said scraper is caused to remove solids from the lower side of the plate above on upward movement of said shaft and from the upper side of the plate below on downward movement of said shaft and means for introducing liquid to be filtered into said shell and means for introducing steam into said shell.

3. A filter press adapted to be supported in a fixed vertical position, comprising: a cylindrical substantially closed shell having heads, the upper of said heads being removable; a nozzle of relatively large diameter centrally affixed to the bottom head and a closure for said nozzle; a plurality of horizontal filter plates stacked within said shell and having vertically projecting rims adapted to space said plates and form chambers therebetween, said plates having central openings aligned with and of substantially the same diameter as said nozzle; corrugations on both surfaces of each said plate; means for the passage of liquids from said corrugations into a threaded radial opening formed on the circumference of each said plate; a filtering medium attached to each side of each said plate and covering said corrugations; a stuffing box attached to the wall of said shell and an opening through said wall in alignment with said threaded opening; a conductor for liquids passing through said stuffing box and said shell and removably screwed into said threaded opening; a vertical shaft axially supported within said shell and said central openings in said plates, and passing through the upper of said heads; scrapers removably attached to and revolved by said shaft, the normal position of each said scraper being midway between the two adjacent plates; means for revolving said shaft; means for raising and lowering said shaft while revolving, whereby said scraper is caused to remove solids from the lower side of the plate above on upward movement of said shaft and from the upper side of the plate below on downward movement of said shaft; means for introducing liquid to be filtered into said shell and means for introducing steam into said shell.

4. In a device substantially as and for the purpose set forth in claim 3, a means for preventing scraping contact between said scrapers and said filtering medium, comprising: a shaft, as described, having other than cylindrical section between its upper and lower bearing boxes; scrapers as described having hubs with openings adapted to slide freely on said shaft, and open coil springs around said shaft between said scrapers and between the end scrapers and the bearing boxes supporting said shaft, said springs being of such length and tension as to hold said scrapers centrally spaced between said filtering plates when said shaft is midway its vertical travel, and flanges vertically projecting from said plates around said central openings and adapted to prevent contact between said scraper and said filtering medium when each said scraper is urged toward a contiguous plate by the pressure exerted by the springs behind said scraper when said shaft is moved vertically in either direction.

5. A filter press adapted to be supported in a fixed vertical position, comprising: a cylindrical substantially closed shell having heads, the upper of said heads being removable; a nozzle of relatively large diameter centrally affixed to the bottom head and a closure for said nozzle; a plurality of horizontal metallic filter plates stacked within said shell and rings adjacent the wall of said shell adapted to space said plates and form chambers therebetween, said plates having central openings aligned with and of substantially the same diameter as said nozzle; corrugations on both surfaces of each said plate; channels for the passage of liquids from said corrugations to the exterior of said shell; a filtering medium attached to each side of each said plate and covering said corrugations; a vertical shaft axially supported within said shell and said central openings in said plates, and passing through the upper of said heads; scrapers removably attached to and revolved by said shaft, the normal position of each said scraper being midway between the two adjacent plates; means for revolving said scrapers; means for raising and lowering said shaft while revolving, whereby said scraper is caused to remove solids from the lower side of the plate above on upward movement of said shaft and from the upper side of the plate below on downward movement of said shaft and means for introducing liquid to be filtered into said shell.

In witness that I claim the foregoing I have hereunto subscribed my name this 25th day of February, 1930.

PAUL W. PRUTZMAN.